(12) United States Patent
Matsumura et al.

(10) Patent No.: US 9,213,326 B2
(45) Date of Patent: Dec. 15, 2015

(54) SERVO SELECTION SYSTEM

(75) Inventors: Hiroshi Matsumura, Tokyo (JP);
Tomohiro Miyazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 614 days.

(21) Appl. No.: 13/701,212

(22) PCT Filed: Mar. 30, 2012

(86) PCT No.: PCT/JP2012/058692
§ 371 (c)(1),
(2), (4) Date: Nov. 30, 2012

(87) PCT Pub. No.: WO2013/145296
PCT Pub. Date: Oct. 3, 2013

(65) Prior Publication Data
US 2013/0317633 A1   Nov. 28, 2013

(51) Int. Cl.
G05B 15/02   (2006.01)
(52) U.S. Cl.
CPC ................................... G05B 15/02 (2013.01)
(58) Field of Classification Search
CPC ......................................................... G05B 15/02
See application file for complete search history.

(56) References Cited

U.S. PATENT DOCUMENTS

| | | | | |
|---|---|---|---|---|
| 6,002,650 | A * | 12/1999 | Kuribayashi | G05B 19/4097 29/703 |
| 6,219,895 | B1 * | 4/2001 | Muscarella | B23Q 5/10 29/38 A |
| 6,744,233 | B1 * | 6/2004 | Tsutsui | G05B 19/404 318/560 |
| 7,984,009 | B2 | 7/2011 | Komiya et al. | |
| 7,987,026 | B2 * | 7/2011 | Yi | A63H 19/32 701/19 |
| 8,406,503 | B2 * | 3/2013 | Ueda | G01N 21/956 382/141 |
| 2004/0167833 | A1 | 8/2004 | Schickler | |
| 2005/0038537 | A1 | 2/2005 | Okada et al. | |
| 2005/0080502 | A1 | 4/2005 | Chernyak et al. | |
| 2008/0203231 | A1 * | 8/2008 | Taya | A63H 30/04 244/190 |
| 2008/0224575 | A1 * | 9/2008 | Taya | A63H 27/12 310/68 B |
| 2010/0189340 | A1 | 7/2010 | Ueda | |
| 2010/0228697 | A1 | 9/2010 | Komiya et al. | |

(Continued)

FOREIGN PATENT DOCUMENTS

| | | |
|---|---|---|
| CN | 101806858 A | 8/2010 |
| CN | 101878589 A | 11/2010 |
| DE | 697 31 151 T2 | 2/2006 |

(Continued)

OTHER PUBLICATIONS

Communication dated Jan. 22, 2015, issued by the German Patent Office in counterpart German application No. 11 2012 006 162.4.

(Continued)

*Primary Examiner* — Ramesh Patel
(74) *Attorney, Agent, or Firm* — Sughrue Mion, PLLC; Richard C. Turner

(57) ABSTRACT

A servo selection system includes a replacement-information display unit that displays at least a portion of replacement information corresponding to an input servo product before being replaced and a selected new-model servo product, and the replacement information includes a difference between a specification of the servo product before being replaced and a specification of the new-model servo product, and an operation guideline for replacing the servo product before being replaced with the selected new-model servo product.

2 Claims, 12 Drawing Sheets

(56) References Cited

U.S. PATENT DOCUMENTS

2012/0095884 A1* 4/2012 Tanabe .................. G06Q 10/087
  705/28
2015/0212518 A1* 7/2015 Umeda .................... H02P 5/46
  318/567

FOREIGN PATENT DOCUMENTS

| | | |
|---|---|---|
| EP | 2 442 242 A1 | 4/2012 |
| JP | 7-36525 A | 2/1995 |
| JP | 2002171780 A | 6/2002 |
| JP | 2006-42589 A | 2/2006 |
| JP | 2011-166953 A | 8/2011 |

OTHER PUBLICATIONS

Chinese Office Action, issued May 13, 2014, Application No. 201280002012.7.

* cited by examiner

FIG.3
(a)
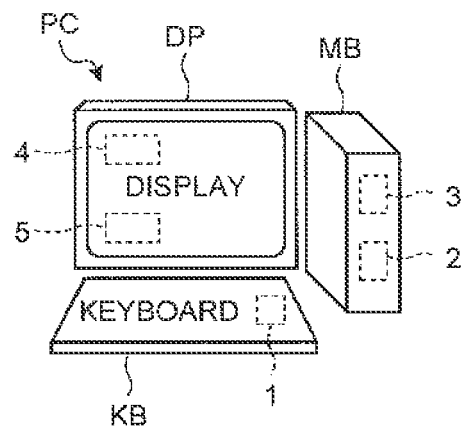
(b)
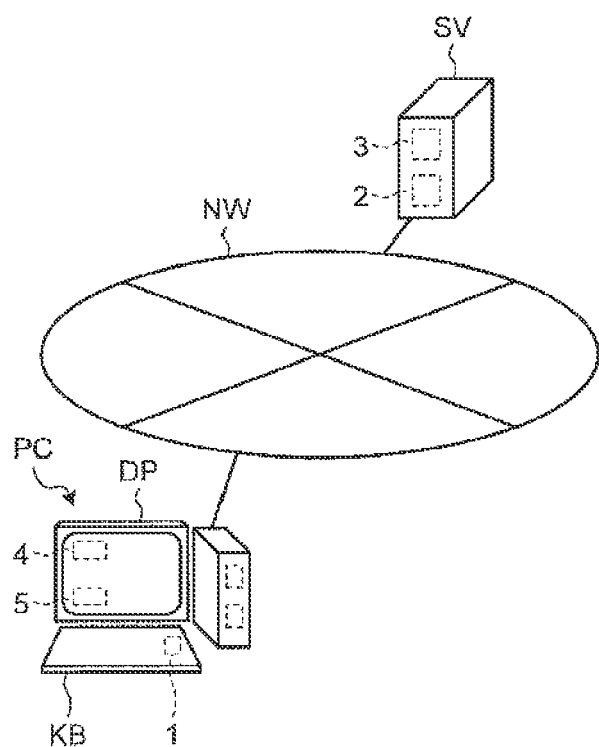

FIG.4

SERVO AMPLIFIER CORRESPONDENCE TABLE — 11

| CONVENTIONAL MODEL NAME | NEW MODEL NAME | SPECIFICATION COMPARISON | REPLACEMENT GUIDELINE |
|---|---|---|---|
| AMPLIFIER a100 | AMPLIFIER a100A | SPECIFICATION COMPARISON a1.doc | GUIDELINE a1A.doc |
| | AMPLIFIER a100B | | GUIDELINE a1B.doc |
| AMPLIFIER a200 | AMPLIFIER a200A | SPECIFICATION COMPARISON a2.doc | GUIDELINE a2.doc |
| ⋮ | ⋮ | ⋮ | ⋮ |

SERVOMOTOR CORRESPONDENCE TABLE — 12

| CONVENTIONAL MODEL NAME | NEW MODEL NAME | SPECIFICATION COMPARISON | REPLACEMENT GUIDELINE |
|---|---|---|---|
| MOTOR m100 | MOTOR m100A | SPECIFICATION COMPARISON m1.doc | GUIDELINE m1A.doc |
| | MOTOR m100B | | GUIDELINE m1B.doc |
| MOTOR m200 | MOTOR m200A | SPECIFICATION COMPARISON m2.doc | GUIDELINE m2.doc |
| ⋮ | ⋮ | ⋮ | ⋮ |

CABLE CORRESPONDENCE TABLE — 13

| CONVENTIONAL MODEL NAME | NEW MODEL NAME | SPECIFICATION COMPARISON | REPLACEMENT GUIDELINE |
|---|---|---|---|
| CABLE c100 | CABLE c100A | SPECIFICATION COMPARISON c1.doc | GUIDELINE c1.doc |
| CABLE c200 | CABLE c200A | SPECIFICATION COMPARISON c2.doc | GUIDELINE c2.doc |

FIG.5

| | | THIRD COLUMN | FOURTH COLUMN | |
|---|---|---|---|---|
| SERVO AMPLIFIER CORRESPONDENCE TABLE | | | | |
| ITEM | AMPLIFIER a 100 | AMPLIFIER a 100A | AMPLIFIER a 100B | ... |
| ITEM 1 | **** | **** | **** | ... |
| ITEM 2 | **** | **** | **** | ... |
| ITEM 3 | **** | **** | **** | ... |
| **** | **** | **** | **** | ... |
| REPLACEMENT GUIDELINE | | GUIDELINE a1A.doc | GUIDELINE a1B.doc | ... |
| | | | GUIDELINE a1AB.doc | ... |

NTH ROW
(N-1)TH ROW
(N+1)TH ROW

FIG.6

| CONVENTIONAL MODEL NAME | NEW MODEL NAME | SPECIFICATION COMPARISON | REPLACEMENT GUIDELINE |
|---|---|---|---|
| AMPLIFIER a 100 | (1) AMPLIFIER a100A | DISPLAY | DISPLAY |
|  | (2) AMPLIFIER a100B |  | DISPLAY |
| MOTOR m 200 | MOTOR m200A | DISPLAY | DISPLAY |
| CABLE c 100 | CABLE c100A | DISPLAY | DISPLAY |

SELECTION RESULT

FIG.7

| | CONVENTIONAL MODEL NAME | CANDIDATE 1 | CANDIDATE 2 |
|---|---|---|---|
| | AMPLIFIER a100 | AMPLIFIER a100A | AMPLIFIER a100B |
| | MOTOR m200 | MOTOR m200A | MOTOR m200A |
| | CABLE c100 | CABLE c100A | CABLE c100A |
| | | | |
| CHAR-ACTER-ISTIC | | | |
| PRICE | | | |
| | | REPLACEMENT GUIDELINE | REPLACEMENT GUIDELINE |
| | | STORE | STORE |

SELECTION RESULT

FIG.8

| ITEM | AMPLIFIER a100 | AMPLIFIER a100A | AMPLIFIER a100B |
|---|---|---|---|
| ITEM 1 | **** DETAILS | **** DETAILS | **** DETAILS |
| ITEM 2 | **** DETAILS | **** DETAILS | **** DETAILS |
| ITEM 3 | **** DETAILS | **** DETAILS | **** DETAILS |
| OTHER CHARA- CTERISTIC | **** DETAILS | **** DETAILS | **** DETAILS |

SPECIFICATION COMPARISON

FIG.10

| | | 51s-1 | | 51 |
|---|---|---|---|---|

| PARAMETER CORRESPONDENCE TABLE | | | | | _ □ X |
|---|---|---|---|---|---|
| NEW AMPLIFIER a 100A | | CONVENTIONAL AMPLIFIER a 100 | | PARAMETER CONVERSION METHOD | |
| **** | DETAILS | **** | DETAILS | **** | |
| **** | DETAILS | NONE | | **** | |
| **** | DETAILS | **** | DETAILS | **** | |
| **** | DETAILS | **** | DETAILS | **** | |
| | | | | | |

SERVO AMPLIFIER CORRESPONDENCE TABLE

| CONVENTIONAL MODEL NAME | NEW MODEL NAME | SPECIFICATION COMPARISON | REPLACEMENT GUIDELINE | FUNCTION |
|---|---|---|---|---|
| AMPLIFIER a100 | AMPLIFIER a100A | SPECIFICATION COMPARISON a1.doc | GUIDELINE a1A.doc | FUNCTION 1 FUNCTION 2 |
| | AMPLIFIER a100B | | GUIDELINE a1B.doc | ... |
| AMPLIFIER a200 | AMPLIFIER a200A | SPECIFICATION COMPARISON a2.doc | GUIDELINE a2.doc | ... |
| ⋮ | ⋮ | ⋮ | ⋮ | ⋮ |

SERVOMOTOR CORRESPONDENCE TABLE

| CONVENTIONAL MODEL NAME | NEW MODEL NAME | SPECIFICATION COMPARISON | REPLACEMENT GUIDELINE | FUNCTION |
|---|---|---|---|---|
| MOTOR m100 | MOTOR m100A | SPECIFICATION COMPARISON m1.doc | GUIDELINE m1A.doc | ... |
| | MOTOR m100B | | GUIDELINE m1B.doc | ... |
| MOTOR m200 | MOTOR m200A | SPECIFICATION COMPARISON m2.doc | GUIDELINE m2.doc | ... |
| ⋮ | ⋮ | ⋮ | ⋮ | ⋮ |

CABLE CORRESPONDENCE TABLE

| CONVENTIONAL MODEL NAME | NEW MODEL NAME | SPECIFICATION COMPARISON | REPLACEMENT GUIDELINE | FUNCTION |
|---|---|---|---|---|
| CABLE c100 | CABLE c100A | SPECIFICATION COMPARISON c1.doc | GUIDELINE c1.doc | ... |
| CABLE c200 | CABLE c200A | SPECIFICATION COMPARISON c2.doc | GUIDELINE c2.doc | ... |

SERVO SELECTION SYSTEM

CROSS REFERENCE TO RELATED APPLICATIONS

This application is a National Stage of International Application No. PCT/JP2012/058692 filed on Mar. 30, 2012, the content of which is incorporated herein by reference in its entirety.

FIELD

The present invention relates to a servo selection system.

BACKGROUND

A servo system for controlling the movement of a mechanical apparatus is constituted by a plurality of servo products such as a plurality of servomotors serving as a power source of a machine, a plurality of servo amplifiers for controlling driving of the servomotors, a motion controller for issuing a command to each of the servo amplifiers, and a cable for connecting these devices and other optional parts. Among these servo products, selection of, in particular, a servomotor and a servo amplifier requires a time consuming calculation, and therefore a servo selection system is required, which is a software tool for supporting the selection.

Patent Literature 1 describes a servomotor selection apparatus in which an input for selecting a servomotor, a mechanical specification related to a selected servomotor, and a movement pattern of a load are input to an input device, a computation unit obtains a required specification of the servomotor based on the contents of the input to the input device, and a search unit searches for a motor suitable for a required specification of the servomotor from a servomotor specification table stored in a storage device considering rotation speed-torque characteristics. According to Patent Literature 1, it is supposed that the servomotor selection apparatus is capable of properly determining whether a motor can be applied even in an area of rotation speed in which a sufficient output torque in not obtained because the rotation speed-torque characteristics are taken into consideration as a motor searching procedure.

CITATION LIST

Patent Literature

Patent Literature 1: Japanese Patent Application Laid-open No. 2006-42589

SUMMARY

Technical Problem

In the servomotor selection apparatus described in Patent Literature 1, it is prerequisite to perform the input for selecting the servomotor, the input of the mechanical specification, and the input of the movement pattern of the load, and is thus considered to be an apparatus used when designing a new servo system. Therefore, even when replacing a conventionally-used servo product such as a servomotor or a servo amplifier with a new model, the servomotor selection apparatus described in Patent Literature 1 eventually forces a user to input the mechanical specification and the movement pattern and to start over the selection of the servo product, which is wasteful and laborious, and accordingly it is difficult to appropriately support a replacement of the conventionally-used servo product with a new model.

Furthermore, because the servo product is incorporated in the entire control system of a mechanical apparatus as a sub-system, it is required to select the servo product in consideration of the size of each servo product and the connection method with respect to a peripheral device when replacing the servo product.

However, in the servomotor selection apparatus described in Patent Literature 1, because the servo product is selected based on only the speed and the torque of the motor, it is not possible to consider the size of the servo product and the connection method with respect to the peripheral device, requiring the user to separately consider these factors by referring to a manual or the like. Therefore, it is difficult to appropriately support a replacement of the conventionally-used servo product with a new model.

Further, because the servo amplifier is configured such that its functions are set by parameters, it is required to consider functions that have been used in the conventionally-used model and functions that have not been used in the conventionally-used model when selecting a new model.

However, in the servomotor selection apparatus described in Patent Literature 1, it is not possible to consider such conditions, requiring the user to consider these conditions separately by referring to a manual or the like. Accordingly, with the servomotor selection apparatus described in Patent Literature 1, it is difficult to appropriately support a replacement of the conventionally-used servo product with a new model.

The present invention has been achieved in view of the above problems, and an object of the present invention is to provide a servo selection system that can appropriately support a replacement of a conventionally-used servo product with a new model.

Solution to Problem

In order to solve the aforementioned problems, a servo selection system for selecting a plurality of servo products including at least a servomotor and a servo amplifier constituting a servo system according to one aspect of the present invention is configured in such a manner as to include: a conventional-model-name input unit that receives a model name of a servo product before being replaced; a model database in which a model name of a first servo product, a model name of a second servo product, and replacement information required for replacing the first servo product with the second servo product are associated with one another with respect to a plurality of the first servo products; a new-model selection unit that selects a new-model servo product compatible with the input servo product before being replaced, based on the input model name of the servo product before being replaced and the model database; a new-model-name display unit that displays a model name of the selected new-model servo product; and a replacement-information display unit that displays at least a portion of the replacement information corresponding to the input servo product before being replaced and the selected new-model servo product, wherein the replacement information includes a difference in a specification between the servo product before being replaced and the selected new-model servo product, and an operation guideline for replacing the servo product before being replaced with the selected new-model servo product.

Advantageous Effects of Invention

According to the present invention, a replacement-information display unit can compare and display specifications of a conventionally-used model and a new model and display a guideline for replacing the conventionally-used model with the new model. With this configuration, it is possible to verify the compatibility in the size of a servo product to be replaced and the connection method with respect to a peripheral device on a servo selection system in a simple manner without referring to any manual or catalog. As a result, it is possible to appropriately support a replacement of a conventionally-used servo product with a new model.

BRIEF DESCRIPTION OF DRAWINGS

FIG. 3 depict a configuration of the servo selection system according to the first embodiment.

FIG. 4 depicts a data structure of a model database according to the first embodiment.

FIG. 5 depicts another data structure of the model database according to the first embodiment.

FIG. 6 depicts a screen displayed by a new-model-name display unit according to the first embodiment.

FIG. 7 depicts another screen displayed by the new-model-name display unit according to the first embodiment.

FIG. 8 depicts a screen displayed by a replacement-information display unit according to the first embodiment.

FIG. 10 depicts another screen displayed by the replacement-information display unit according to the first embodiment.

FIG. 13 depicts a data structure of a model database according to the second embodiment.

DESCRIPTION OF EMBODIMENTS

Exemplary embodiments of a servo selection system according to the present invention will be explained below in detail with reference to the accompanying drawings. The present invention is not limited to the embodiments.

First Embodiment

Figure 1:
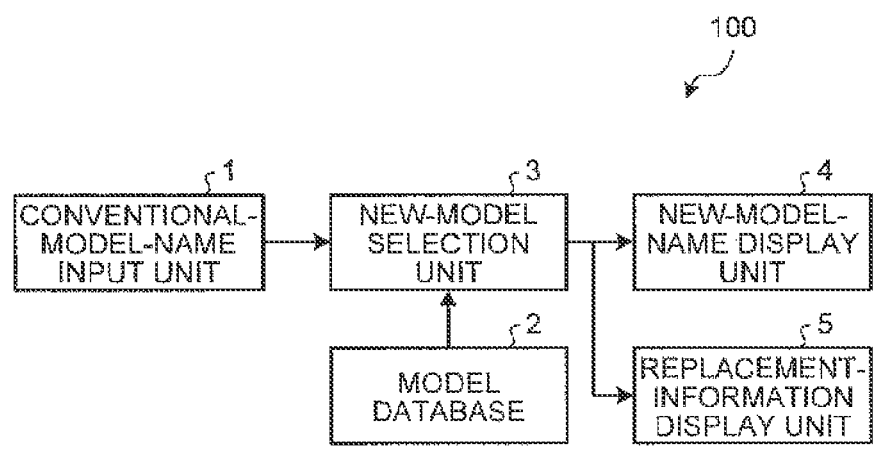
FIG. 1 depicts a configuration of a servo selection system according to a first embodiment.

A servo selection system 100 according to a first embodiment is explained with reference to FIG. 1. FIG. 1 depicts a configuration of the servo selection system 100.

The servo selection system 100 is a servo selection system used when designing a servo system S.

Figure 2:
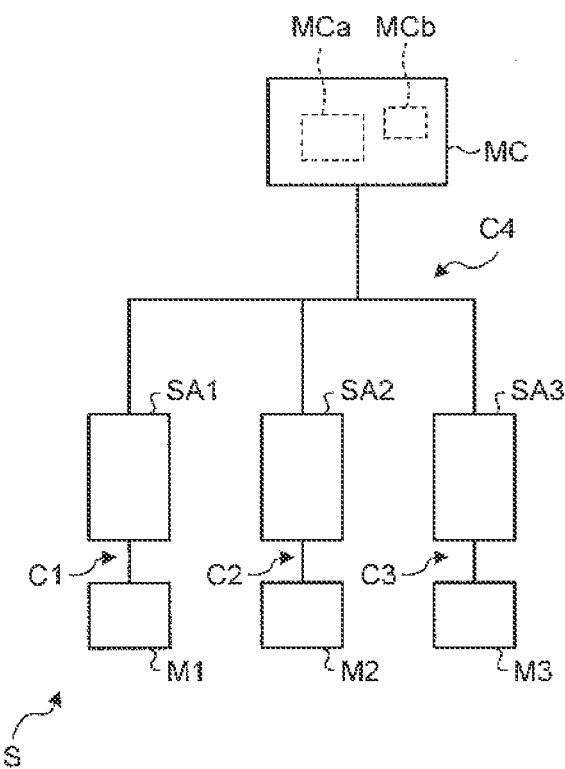
FIG. 2 depicts a configuration of a servo system according to the first embodiment.

For example, the servo system S is constituted by a plurality of servo products shown in FIG. 2, and the servo products includes, for example, a motion controller MC, a plurality of servo amplifiers SA1 to SA3, a plurality of servomotors M1 to M3, and a plurality of cables C1 to C4. Each of the motors M1 to M3 serves as a power source for respective predetermined machine and includes, for example, a servomotor including a stator and a rotor and a linear motor-type servomotor including a stator and a slider. Each of the servo amplifiers SA1 to SA3 is connected to the respective servomotors M1 to M3 with the respective cables C1 to C3, and controls driving of the respective servomotors M1 to M3 via the respective cables C1 to C3. The motion controller MC is connected to the servo amplifiers SA1 to SA3 with a cable C4 or the like, and for example, transmits a command to each of the servo amplifiers SA1 to SA3 via the cable C4 or the like.

In the servo system S, one or more than one old-model servo products, among the motion controller MC, the servo amplifiers SA1 to SA3, the servomotors M1 to M3 and the cables C1 to C4, may need to be replaced with a new model. At the time when a replacement is necessary, for example, the servo selection system 100 supports the replacement of an old model that has been used so far with a new model.

Specifically, as shown in FIG. 1, the servo selection system 100 includes a conventional-model-name input unit 1, a model database 2, a new-model selection unit 3, a new-model-name display unit 4, and a replacement-information display unit 5. In the servo selection system 100, all these constituent elements can be incorporated in one personal computer, or at least a part of the constituent elements can be incorporated in a server connected via a network NW such as the Internet.

For example, when all the constituent elements are incorporated in one personal computer PC, as shown in FIG. 3(a), a keyboard KB of the personal computer PC, a GUI screen displayed on a display DP, and the like (when the screen is a touch panel, a hardware configuration for a display input and a module for an input process related to the display input, or a hardware configuration for a voice input and a module for an input process related to the voice input) function as the conventional-model-name input unit 1. Furthermore, the display DP, a module for a display process, and the like function as the new-model-name display unit 4 and the replacement-information display unit 5. For example, the model database 2 is stored in a hard disk in a main body MB of the personal computer PC. The new-model selection unit 3 is realized as a software module installed in the hard disk in the main body MB of the personal computer PC and deployed in a memory when needed.

Alternatively, for example, when at least a part of the constituent elements is incorporated in a server SV via the network NW, as shown in FIG. 3(b), for example, the conventional-model-name input unit 1, the new-model-name display unit 4, and the replacement-information display unit 5 are incorporated in the personal computer PC on a user side, and the remaining elements of the model database 2 and the new-model selection unit 3 are incorporated in the server SV via the network NW. Alternatively, for example, the conventional-model-name input unit 1 is incorporated in the personal computer PC on the user side, and the remaining elements of the new-model-name display unit 4, the replacement-information display unit 5, the model database 2, and the new-model selection unit 3 are incorporated in the server SV via the network NW. Still alternatively, for example, the conventional-model-name input unit 1, the new-model selection unit 3, the new-model-name display unit 4, and the replacement-information display unit 5 are incorporated in the personal computer PC on the user side, and the remaining element of the model database 2 is incorporated in the server SV via the network NW.

Model names of a servo amplifier and a servomotor that constitute a currently used servo system, a cable that is an optional component, and other servo products are input to the conventional-model-name input unit 1 by a user. That is, model names of servo products before being replaced are input to the conventional-model-name input unit 1. The conventional-model-name input unit 1 supplies input information to the new-model selection unit 3.

The model database 2 stores therein a model name of an old model and a model name of a new model that is compatible with the old model, a specification of each model, and pieces of information on a difference in the specification between models, a replacement method, and the like. That is, in the model database 2, a model name of a first servo product, a model name of a second servo product, and replacement information required to replace the first servo product with the second servo product are associated with one another for a plurality of first servo products. For example, the replacement information includes first information on the difference in the specification between a servo product before being replaced and a selected new-model servo product and second information on an operation guideline for replacing the servo product before being replaced with the selected new-model servo product (see FIG. 4).

The new-model selection unit 3 receives the input information on the model name of the conventional model from the conventional-model-name input unit 1. Upon receiving the information on the model name of the conventional model, the new-model selection unit 3 refers to the model database 2. The new-model selection unit 3 selects a new model that can replace the input conventional model and the replacement information associated with the selected new model based on the model name of the conventional model input to the conventional-model-name input unit 1 and the information stored in the model database 2. That is, the new-model selection unit 3 selects a servo product of the new model that is compatible with the input servo product before being replaced and the replacement information associated with the selected servo product based on the model name of the servo product before being replaced input to the conventional-model-name input unit 1 and the model database 2. The new-model selection unit 3 supplies a result of the selection to the new-model-name display unit 4 and the replacement-information display unit 5.

The new-model-name display unit 4 receives the result of the selection from the new-model selection unit 3. For example, the new-model-name display unit 4 receives information indicating the model name of the selected servo product (for example, an identifier for identifying the model name or the model name itself) from the new-model selection unit 3 as the result of the selection. The new-model-name display unit 4 displays the model name of the servo product selected by the new-model selection unit on a display unit (for example, the display DP shown in FIGS. 3(a) and 3(b)) according to the result of the selection.

The replacement-information display unit 5 receives the result of the selection from the new-model selection unit 3. For example, the replacement-information display unit 5 receives information indicating the replacement information required to replace the servo product before being replaced with the selected new-model servo product (for example, a reference number for identifying the replacement information or the replacement information itself) from the new-model selection unit 3 as the result of the selection. The replacement-information display unit 5 displays at least a portion of the replacement information on a display unit (for example, the display DP shown in FIGS. 3(a) and 3(b)) according to the result of the selection. The replacement information includes first information on the difference in the specification between the servo product before being replaced and the selected new-model servo product and second information on the operation guideline for replacing the servo product before being replaced with the selected new-model servo product. For example, the replacement-information display unit 5 can display the first information and the second information on a display unit in a selective manner or display the first information and the second information on a display unit at the same time.

A data structure of the model database 2 is explained next with reference to FIG. 4. FIG. 4 depicts the data structure of the model database 2.

For example, as shown in FIG. 4, the model database 2 includes correspondence tables 11, 12, and 13 showing correspondence relationships between a conventional model and a new model that is compatible with the conventional model for a servo amplifier, a servomotor, and a cable, respectively. The correspondence tables 11 to 13 have the same data structure.

For example, in the correspondence table 11 of a servo amplifier, the model name of the conventional model is recorded in a first column 11a, the model name of the new model that is compatible with the conventional model is recorded in a second column 11b, a document name of a document describing a difference in a specification between the conventional model and the new model is recorded in a third column 11c, and a document name of a document describing notes on a replacement of the conventional model with the new model and an operation guideline in the replacement is recorded in a fourth column 11d. The first column 11a corresponds to the model name of the first servo product, the second column 11b corresponds to the model name of the second servo product, and the third column 11c and the fourth column 11d correspond to the replacement information required to replace the first servo product with the second servo product.

For example, in the correspondence table 11 of the servo amplifier, information is stored, which indicates that the model name of the new model that is compatible with the name of the conventional model "amplifier a100" includes two types, that is, "amplifier a100A" and "amplifier a100B", the document describing the difference in the specification between the servo amplifiers is "specification comparison a1.doc", and the documents describing the notes on the replacement and the operation guideline in the replacement are "guideline a1A.doc" and "guideline a1B.doc".

Similarly, for example, in the correspondence table 12 of a servomotor, the model name of the conventional model is recorded in a first column 12a, the model name of the new model that is compatible with the conventional model is recorded in a second column 12b, a document name of a document describing the difference in the specification between the conventional model and the new module is recorded in a third column 12c, and a document name of a document describing notes on the replacement of the conventional model with the new model and the operation guideline in the replacement is recorded in a fourth column 12d. The first column 12a corresponds to the model name of the first servo product, the second column 12b corresponds to the model name of the second servo product, and the third column 12c and the fourth column 12d correspond to the replacement information required to replace the first servo product with the second servo product.

For example, in the correspondence table 13 of a cable, the model name of the conventional model is recorded in a first column 13a, the model name of the new model that is compatible with the conventional model is recorded in a second column 13b, a document name of a document describing the difference in the specification between the conventional model and the new module is recorded in a third column 13c, and a document name of a document describing notes on the replacement of the conventional model with the new model and the operation guideline in the replacement is recorded in a fourth column 13d. The first column 13a corresponds to the model name of the first servo product, the second column 13b corresponds to the model name of the second servo product, and the third column 13c and the fourth column 13d correspond to the replacement information required to replace the first servo product with the second servo product.

Alternatively, for example, as shown in FIG. 5, a model database 2i can be a database in which a specification and performances of each model are recorded in a table format for each of a servo amplifier, a servomotor, and a cable. The model database 2i is configured such that, when one model name of the conventional model is designated, a new model having the same specification as the designated model or higher can be searched.

For example, in a correspondence table 11i of the servo amplifier, model names of a plurality of models are recorded in a first row 11ia, document names of a plurality of documents describing the difference in the specification between the conventional model and the new model are recorded in second to (N−1)th rows 11ic, and a document name of a document describing notes on the replacement of the conventional model with the new model and the operation guideline in the replacement is recorded in Nth and subsequent rows 11id. For example, in the first row 11ia, the model names are arranged sequentially from a model having an old specification to a model having the latest specification, and when a product in any column is selected as the conventional model, a model on the right side from the column is identified as the new model having the same specification as the product or higher. In the second to (N−1)th rows 11ic, information indicating the difference between the conventional model and the new model can be obtained by extracting and comparing a column identified as the conventional model and the column identified as the new model. For example, in the Nth and subsequent rows 11id, the document name of the document describing the notes on the replacement of the conventional model with the new model and the operation guideline in the replacement can be identified by identifying elements corresponding to the column identified as the conventional model and the column identified as the new model. The Nth and subsequent rows hid has, for example, a data structure in which the number of elements increases toward the right row side, on the assumption that the conventional model is never replaced with an even older model.

For example, when "amplifier a100" is identified as the conventional model and "amplifier a100B" is identified as the new model, in the second to (N−1)$_{th}$ rows 11ic, the information indicating the difference in the specification between the conventional model and the new model can be obtained by extracting and comparing information of a second column and information of a fourth column. In the Nth and subsequent rows 11id, a document name "guideline a1B.doc" describing the notes on the replacement of the conventional model with the new model and the operation guideline in the replacement is identified by identifying an element in the Nth row and the fourth column as the element corresponding to the second column and the fourth column.

For example, when "amplifier a100A" is identified as the conventional model and "amplifier a100B" is identified as the new model, in the second to (N−1)$_{th}$ rows 11ic, the information indicating the difference in the specification between the conventional model and the new model can be obtained by extracting and comparing information of a third column and information of the fourth column. In the Nth and subsequent rows 11id, a document name "guideline a1AB.doc" describing the notes on the replacement of the conventional model with the new model and the operation guideline in the replacement is identified by identifying an element in an (N+1)th row and the fourth column as the element corresponding to the third column and the fourth column.

Although not shown in the drawings, the model database 2i can also include correspondence tables having the same data structure as that of the correspondence table 11i for the servo amplifier as for the servomotor and the cable.

A screen display by the new-model-name display unit 4 is explained next with reference to FIG. 6. FIG. 6 depicts a screen displayed by the new-model-name display unit 4.

When the conventional-model-name input unit 1 receives an input of a model name of a conventional model from a user, the new-model selection unit 3 refers to the model database 2 according to the input, and selects a new model that can replace the input conventional model. The model name of the selected new model is displayed on a display unit by the new-model-name display unit 4 as a selection result screen 21 shown in FIG. 6, for example.

On the selection result screen 21, model names 21a-1 to 21a-3 of the conventional models input by the user and model names 21b-1 to 21b-3 of the new models that are replacement candidates corresponding to the input conventional models are displayed. In addition, buttons 21c-1 to 21c-3 for comparing and displaying the specifications of the models and buttons 21d-1 to 21d-4 for displaying the operation guideline for the replacement of the conventional model with the new model are displayed.

For example, when the conventional-model-name input unit 1 receives an input of the conventional model "amplifier a100" from the user, because two types of the model names of the new-model servo amplifier that is compatible with the model name of the conventional model "amplifier a100", that is, "amplifier a100A" and "amplifier a100B" are identified from the model database 2 (see FIG. 4), the model names 21b-1 and 21b-2 of the new models are displayed as the replacement candidates with respect to the model name 21a-1 of the conventional model. In addition, because "specification comparison a1.doc" is identified as the document describing the difference in the specification between the model name "amplifier a100" of the conventional model and the model names "amplifier a100A" and "amplifier a100B" of the new models from the model database 2, the button 21c-1 associated with a document file "specification comparison a1.doc" (an access path thereto and a document name thereof) via the replacement-information display unit 5 (for example, with a hyperlink or the like) is displayed. Furthermore, because "guideline a1A.doc" and "guideline a1B.doc" are identified as the documents describing the notes and operation guideline in the replacement of the model name "amplifier a100" of the conventional model with the model names "amplifier a100A" and "amplifier a100B" of the new models from the model database 2, the buttons 21d-1 and 21d-2 associated with the document files "guideline a1A.doc" and "guideline a1B.doc" (access paths thereto and document names thereof) via the replacement-information display unit 5 (for example, with a hyperlink) are displayed.

Alternatively, for example, as shown in FIG. 7, the new-model-name display unit 4 can display a selection result screen 21i showing replacement candidates in the entire system. In the selection result screen 21i shown in FIG. 7, the replacement candidates in the entire system are shown, so that it is possible to display and compare the price in the entire system. Furthermore, buttons 21id-1 and 21id-2 for displaying a replacement guideline and buttons 21ie-1 and 21ie-2 for storing the result of the selection can be displayed for each of the replacement candidates in the entire system. For example, when the buttons 21id-1 and 21id-2 are pressed, documents describing replacement capacities are merged and reestablished as one document file for each combination of replacements of a servo amplifier, a servomotor, and a cable, and the reestablished document file is displayed. When the buttons 21*ie*-1 and 21*ie*-2 are pressed, the result of the selection can be stored in the hard disk of the personal computer PC (see FIGS. 3(*a*) and 3(*b*)).

Figure 9:
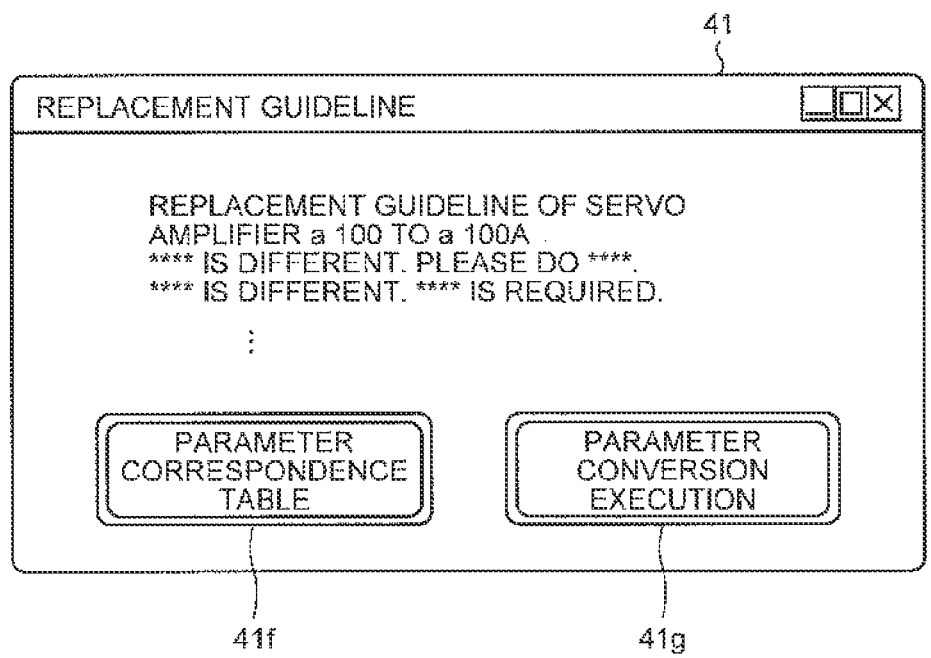
FIG. 9 depicts another screen displayed by the replacement-information display unit according to the first embodiment.

A screen displayed by the replacement-information display unit 5 is explained next with reference to FIGS. 8 and 9. FIGS. 8 and 9 depict a screen displayed by the replacement-information display unit 5.

For example, when the buttons 21*c*-1 to 21*c*-3 for comparing and displaying specifications of models are pressed on the selection result screen 21 shown in FIG. 6, the replacement-information display unit 5 displays a specification comparison screen 31 shown in FIG. 8, for example. On the specification comparison screen 31, the specification of the conventional model and the new models that are replacement candidates are compared and displayed. With this configuration, it is possible to compare the specifications of the conventional model and the replacement candidates so that confirmation of the specifications and a comparison of the specifications of the candidates when there are multiple replacement candidates can be performed in a simple manner. Furthermore, because "details" buttons 31*s*-1 to 31*s*-*k* are provided to display details of each specification, when the "details" buttons 31*s*-1 to 31*s*-*k* are pressed, for example, it is configured that a related page of a manual is displayed.

For example, when the buttons 21*d*-1 to 21*d*-4 for displaying the operation guideline in the replacement of the conventional model with the new model are pressed on the selection result screen 21 shown in FIG. 6, the replacement-information display unit 5 displays a replacement guideline screen 41 shown in FIG. 9, for example. In the replacement guideline screen 41, the notes on the replacement of the conventional model with the new model and the operation guideline in the replacement are displayed. When there is a difference between the size of the conventional model and that of the new model or a difference in the connection method with respect to a peripheral device, it is possible to clearly display such differences by using a drawing or the like. With this configuration, it is possible to grasp the labor and cost in the replacement of the model in a simple manner.

As described above, in the present embodiment, because the replacement-information display unit 5 can compare and display the specifications of the conventional model and the new model and can display the replacement guideline, it is possible to verify the compatibility in the size, the connection method with respect to the peripheral device, and the like on the servo selection system in a simple manner without searching a manual for confirmation.

In the servo amplifier, its functions are set with parameters, and contents of the parameters are different for each model. Therefore, it is required to reset the parameter when replacing the model. To this end, a "parameter correspondence table" button 41*f* and a "parameter conversion execution" button 41*g* are provided on the replacement guideline screen 41 shown in FIG. 9.

The "parameter correspondence table" button 41*f* is for comparing and displaying parameters of the conventional model and the new model. When the "parameter correspondence table" button 41*f* is pressed, the replacement-information display unit 5 displays a parameter correspondence table screen 51 shown in FIG. 10, for example. In the parameter correspondence table screen 51 shown in FIG. 10, each of the parameters of the new model corresponds to which of the parameters of the conventional model is displayed on a list.

Furthermore, it is configured that a detailed description of each parameter can be displayed by "details" buttons 51*s*-1 to 51*s*-*k*.

Further, it is possible to automatically convert the parameters of the conventional model into the parameters of the new model with the "parameter conversion execution" button 41*g* shown in FIG. 9. In this case, for example, when the "parameter conversion execution" button 41*g* shown in FIG. 9 is pressed, an input screen (not shown) for designating a file name of a parameter file of the conventional model and an output file name for outputting the parameter of the new model is displayed, and when the file name of the parameter file of the conventional model and the output file name for outputting the parameter of the new model are designated, the parameter of the conventional model can be automatically converted to the parameter of the new model and the converted parameter can be output to the designated file.

Figure 11:
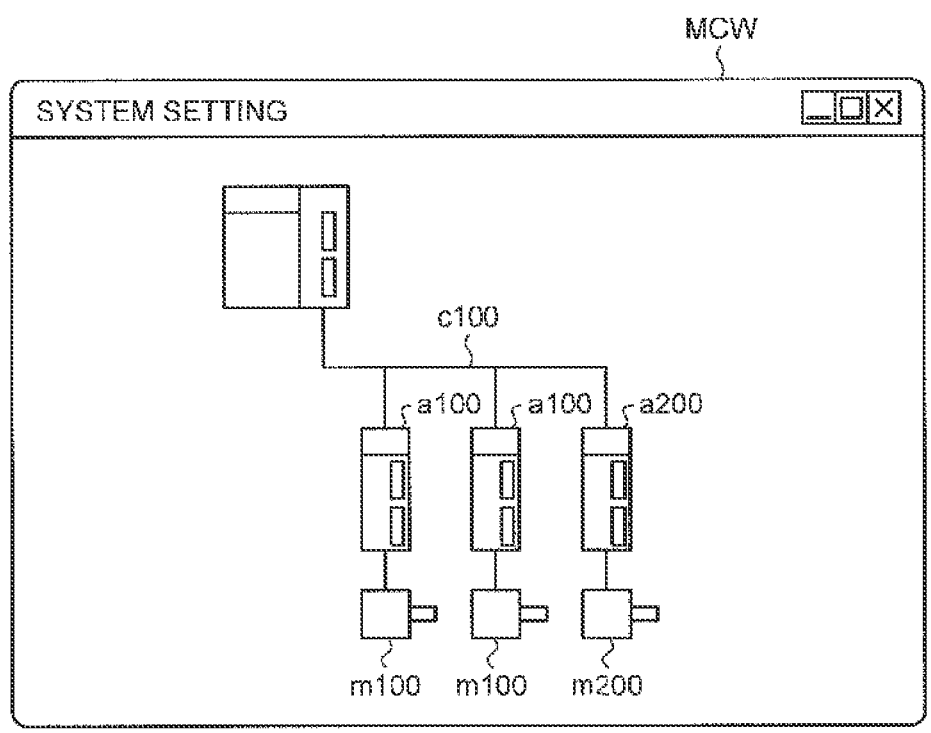
FIG. 11 depicts a system setting tool according to the first embodiment.

In the conventional-model-name input unit 1, the input of the model name of the conventional model can be performed in a simple text format or can be configured to be selected from a list. In addition, in the motion controller MC (see FIG. 2) that is used as a controller for controlling a servo system, for example, the system configuration may be set by using a system setting screen MCW of a system setting tool MCa shown in FIG. 11. For example, in the servo system S (see FIG. 2), in the system setting screen MCW shown in FIG. 11, the model of the cable C4 is set to "cable c100", the models of the servo amplifiers SA1 to SA3 are set to "amplifier a100", "amplifier a100", and "amplifier a200", respectively, and the models of the servomotors M1 to M3 are set to "motor m100", "motor m100", and "motor m200", respectively.

In this case, it is also possible to configure that the model name of the conventional model is input to the conventional-model-name input unit 1 by loading a setting file MCb set by using the system setting tool MCa from the motion controller MC to the personal computer PC (see FIGS. 3(*a*) and 3(*b*)) through a communication line or via a recording medium.

Furthermore, it is also possible to input the entire configuration of the servo system by a setting file of such a system setting tool, to select only a part of the servo products as a replacement target to be replaced, and to perform a selection of replacing the selected servo products with new models. For example, there is a case where it is desired to replace only a servo amplifier with a new model in a servo system including a motion controller, the servo amplifier, a servomotor, and the like. The servo system is constituted by servo products connected to one another. Therefore, when not only the model name of the servo product to be replaced but the entire configuration of the servo system is input, information of a peripheral device connected to the servo product to be replaced can be used. With this configuration, it is possible to appropriately select a replacement candidate.

As described above, in the first embodiment, the model database 2 is configured in such a manner that the model name of the first servo product, the model name of the second servo product, and the replacement information required to replace the first servo product with the second servo product are associated with one another for the first servo products therein. With this configuration, when the model name of the servo product before being replaced is input to the conventional-model-name input unit 1, the new-model selection unit 3 can select the new-model servo product that is compatible with the servo product before being replaced in a simple manner, and the new-model-name display unit 4 can display the model name of the selected new-model servo product. In addition, when the model name of the servo product before being replaced is input to the conventional-model-name input unit 1, the new-model selection unit 3 can select the replacement information associated with the servo product before being replaced and the new-model servo product, and therefore the replacement-information display unit 5 can display at least a portion of the replacement information corresponding to the input servo product before being replaced and the selected new-model servo product. That is, the replacement-information display unit 5 can compare and display the specifications of the conventional model and the new model and display the replacement guideline. With this configuration, it is possible to confirm the compatibility in the size of the servo product to be replaced and the connection method with respect to a peripheral device on the servo selection system in a simple manner without referring to any manual or catalog for confirmation. As a result, it is possible to appropriately support a selection of a model for replacing the servo product that has been used so far with the new model.

Second Embodiment

A servo selection system 100j according to a second embodiment is explained next. In the following descriptions, features different from those in the first embodiment are mainly explained.

In the first embodiment, a function that has been used in a servo product before being replaced is not particularly considered. However, in the second embodiment, a fact that a function that has been used in a servo product before being replaced is required after a replacement of the servo product is considered, and the replacement-target servo product is narrowed down by using the function that has been used in the servo product before being replaced.

Figure 12:
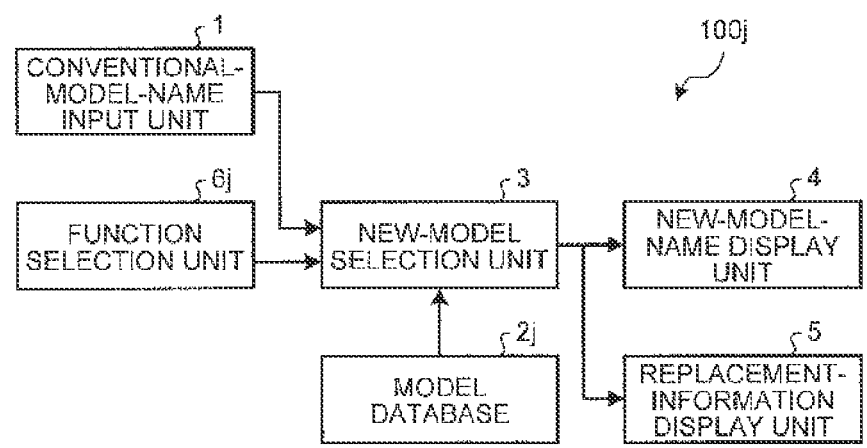
FIG. 12 depicts a configuration of a servo selection system according to a second embodiment.

Specifically, the servo selection system 100j further includes a function selection unit 6j as shown in FIG. 12.

For example, although a servo amplifier has various functions, there may be a case where not all of the functions of the servo amplifiers SA1 to SA3 are used in the servo system S (see FIG. 2), but some of the functions are selectively used. In this case, necessary functions are selected and used by using parameters. In FIG. 12, it is configured that functions that have been used in a conventional system are selected by the function selection unit 6j. That is, the function selection unit 6j stores therein information indicating functions that have been used in a servo product before being replaced and selects the functions that have been used in the servo product before being replaced when performing the replacement. The function selection unit 6j notifies a result of the selection to the new-model selection unit 3.

At this time, in a model database 2j shown in FIG. 13, a model name of a first servo product, a model name of a second servo product, replacement information required to replace the first servo product with the second servo product, and a list of functions of the second servo product are associated with one another for a plurality of first servo products. For example, a list of functions of the new model is described in a fifth column 11je in a correspondence table 11j for the servo amplifier, the list of the functions of the new model is described in a fifth column 12je in a correspondence table 12j for the servomotor and the list of the functions of the new model is described in a fifth column 13je in a correspondence table 13j for a cable.

In response to this configuration, the new-model selection unit 3 further selects an associated function list of a new-model servo product in addition to the model name of the new model and the associated replacement information when selecting a replacement candidate. The new-model selection unit 3 then eliminates a servo product that does not have the functions selected by the function selection unit 6j from the selected new-model servo products if there is such a servo product. That is, the new-model selection unit 3 selects a servo product that corresponds to the functions selected by the function selection unit 6j as the new-model servo product that is compatible with that of the conventional model.

As described above, in the second embodiment, the new-model selection unit 3 selects a servo product that corresponds to the functions selected by the function selection unit 6j as the new-model servo product that is compatible with the conventional model. With this configuration, it is possible to select the functions that have been used in the conventional model and to select a new model that covers the selected functions, preventing a new model having unnecessary high performance from being selected.

The function selection unit 6j can be configured to select functions of the conventional model from a list. Furthermore, it is also possible to configure that a parameter file of the conventional model is loaded and the functions are automatically selected based on set parameters of the conventional model.

Among the selected new-model servo products, if there is any servo product that does not have functions selected by the function selection unit 6j, the new-model selection unit 3 may selectively leave the servo product as a replacement candidate. With this configuration, it is possible to select a new model by considering a function that has not been used in the conventional model. Also with this configuration, it is possible to appropriately support the selection of a new model for replacing the servo product that has been used so far with the new model.

INDUSTRIAL APPLICABILITY

As described above, the servo selection system according to the present invention is useful for replacing a servo product.

REFERENCE SIGNS LIST 1 conventional-model-name input unit
2, 2i, 2j model database
3 new-model selection unit
4 new-model-name display unit
5 replacement-information display unit
6j function selection unit
100, 100j servo selection system

The invention claimed is:
1. A servo selection system for selecting a plurality of servo products including at least a servomotor and a servo amplifier constituting a servo system, the servo selection system comprising:
a conventional-model-name input unit to which a model name of a servo product before being replaced is input;
a model database in which a model name of a first servo product, a model name of a second servo product, and replacement information required for replacing the first servo product with the second servo product are associated with one another with respect to a plurality of the first servo products;
a new-model selection unit that selects a new-model servo product compatible with the input servo product before being replaced, based on the input model name of the servo product before being replaced and the model database;
a new-model-name display unit that displays a model name of the selected new-model servo product; and a replacement-information display unit that displays at least a portion of the replacement information corresponding to the input servo product before being replaced and the selected new-model servo product, wherein the replacement information includes a difference between a specification of the servo product before being replaced and a specification of the selected new-model servo product, and an operation guideline for replacing the servo product before being replaced with the selected new-model servo product.

2. The servo selection system according to claim 1, further comprising a function selection unit that selects a function that has been used in the servo product before being replaced, wherein the new-model selection unit selects a servo product corresponding to the selected function as the compatible new-model servo product.

* * * * *